United States Patent [19]

Noble

[11] 4,455,263

[45] Jun. 19, 1984

[54] ADHESIVE LATEX POLYMERIZATION SURFACTANTS

[75] Inventor: John W. Noble, Mt. Pleasant, S.C.

[73] Assignee: Westvaco Corporation, New York, N.Y.

[21] Appl. No.: 475,597

[22] Filed: Mar. 15, 1983

[51] Int. Cl.³ .............................................. C08L 93/00
[52] U.S. Cl. .................................. 260/503; 562/507; 562/510; 564/191
[58] Field of Search ................. 260/503; 562/507, 510; 564/191

[56] References Cited

U.S. PATENT DOCUMENTS

| | | | |
|---|---|---|---|
| Re. 29,337 | 8/1977 | Ward | 562/510 |
| 3,505,265 | 4/1970 | Teot et al. | 524/747 |
| 3,753,968 | 8/1973 | Ward | 260/97.6 |
| 3,941,836 | 3/1976 | Coleman | 562/507 |
| 4,206,007 | 6/1980 | Force | 156/72 |
| 4,259,459 | 3/1981 | Force | 525/154 |

Primary Examiner—John Kight, III
Assistant Examiner—Amelia B. Yarbrough
Attorney, Agent, or Firm—Terry B. McDaniel; Richard L. Schmalz

[57] ABSTRACT

Mono- and di-2-hydroxyethane sulfonate derivatives and 2-aminoethane sulfonate derivatives of $C_{21}$-cycloaliphatic dicarboxylic acid having the general formula

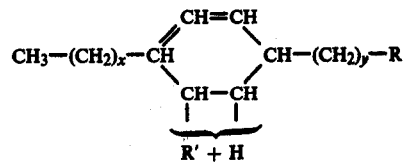

where x and y are integers from 3 to 9, x and y together equal 12, R is

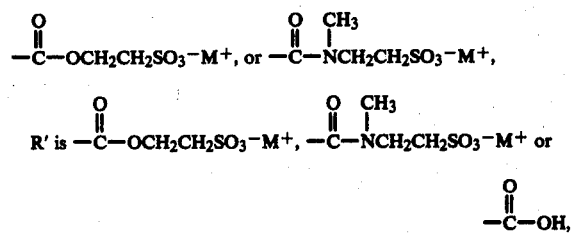

and $M^+$ is an alkali metal, ammonium or amine cation, are disclosed as emulsion polymerization emulsifiers.

3 Claims, No Drawings

ADHESIVE LATEX POLYMERIZATION SURFACTANTS

BACKGROUND OF THE INVENTION

(1) Field of the Invention

This invention pertains to emulsifiers which give improved adhesion when used to prepare adhesive polymeric latices by emulsion polymerization. More particularly, it relates to emulsifiers which are more effective than conventional emulsifiers allowing reduced levels to be used to produce equivalent stability in a dispersed adhesive latex system.

(2) Description of the Prior Art

Emulsion polymers are often used in synthetic adhesives and coatings production. Preparation involves the initiation of polymerization of one or more ethylenically unsaturated monomers in the presence of an aqueous phase containing a suitable emulsifying agent or combination of agents. Emulsifying agents are generally anionic, but sometimes are nonionic or cationic in electrolytic charge of the organic fraction. Among the anionic emulsifying agents utilized for this application are water-soluble soaps, such as alkali metal oleates, stearates, or rosin acids, sulfates of higher alcohols, such as sodium lauryl sulfate, sulfonates of alkyl acyl hydrocarbons such as dodecylbenzene sulfonate, sulfonated alfaolefins, polyether alcohols and a host of analogous and similar surface active emulsifying agents. U.S. Pat. No. 3,505,265 teaches certain divalent salts of alkylated diphenyl ether sulfonates as emulsion polymerization emulsifiers.

The total amount of the emulsifying agent in adhesive latices generally ranges from about 2 to 5 parts per 100 parts of monomer used in the polymerization. This amount is required so that the latex will remain stable to coagulation during handling and further processing. Much of the total emulsifier adsorbs to the individual latex particle surfaces and the higher the emulsifier level, the greater the extent to which the particle surfaces are covered. The emulsion polymer is generally formulated with pigments or extenders and other additives to a variety of coating compositions. Such ingredients compete with the emulsion polymer surface for emulsifier. Since uncoated particle surface is also needed for interaction with compounding ingredients such as thickeners, low emulsifier coverage contributes to minimum quantities of such ingredients being required. Further, excessive colloidal stability of the compounding system requires greater water removal before the emulsion polymer coagulates to adhere the coating components together and to the substrate. Thus, the minimum of emulsifying agent that provides adequate colloidal stability for handling and processing helps insure quick coagulation and fewer problems in drying the coating.

Therefore, it is the object of the present invention to provide emulsion polymerization emulsifiers which produce adhesive and coating compositions with improved adherence to the substrate material. It is a further object to provide emulsion polymerization emulsifiers which when employed in aqueous adhesive and coating compositions in reduced amounts produce adequate stability and yet provide rapid coagulation and improved drying.

SUMMARY OF THE INVENTION

It has been found that lower emulsifying agent levels and greater adhesive strength can be accomplished in latex adhesive systems by using, as the total emulsifier or in conjunction with one or more conventional emulsifiers, either mono- and di-2-hydroxyethane sulfonate derivatives or 2-aminoethane sulfonate derivatives of $C_{21}$-cycloaliphatic dicarboxylic acid having the general formula:

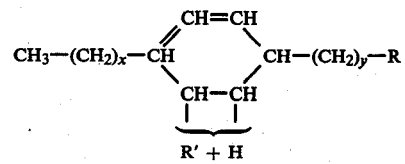

where x and y are integers from 3 to 9, x and y together equal 12, R is

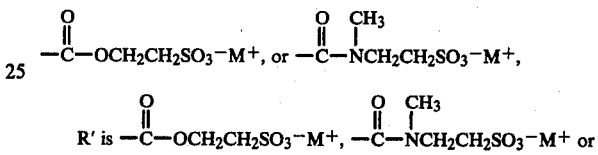

a carboxyl group (COOH), and $M^+$ is an alkali metal, ammonium or amine cation.

DESCRIPTION OF THE PREFERRED EMBODIMENTS

The monomers which may be advantageously polymerized by the process of this invention include, but are not restricted to conjugated dienes, vinyl chloride, vinylidene chloride, styrene, acrylonitrile, vinyl carboxylates, acrylic or methacrylic esters and mixtures thereof.

Examples of conjugated dienes are the 1,3-butadienes including butadiene itself, chloroprene, isoprene, 2-methyl butadiene-1,3, 2-ethyl butadiene-1,3, 2,3-dimethyl butadiene-1,3, and the like. Examples of vinyl carboxylates, that is, monocarboxylic acid esters of vinyl alcohol, are vinyl acetate, vinyl propionate, vinyl butyrate, vinyl caprolate, vinyl laurate, vinyl palmitate, vinyl benzoate and the like. Examples of acrylic esters that is, esters of acrylic and alpha substituted acrylic acids are methyl acrylate, ethyl acrylate, propyl acrylate, isopropyl acrylate, isobutyl acrylate, amyl acrylate, octyl acrylate, 2-ethyl hexyl acrylate, methyl methacrylate, ethyl methacrylate, butyl methacrylate and dimethyl itaconate and the like.

The polymers prepared by the process of this invention can be homopolymers of the aforementioned polymerizable monomers or interpolymers thereof. Typical interpolymers include, for example, copolymers of butadiene and styrene, copolymers of vinyl chloride and vinylidene chloride, copolymers of vinyl chloride and vinyl acetate, copolymers of vinyl acetate and alkanol esters of acrylic and methacrylic acid, copolymers of the alkanol esters of acrylic and methacrylic acid and copolymers of acrylonitrile with the alkanol esters of acrylic and methacrylic acid.

In another embodiment of this invention, carboxylation is introduced into the polymer by addition of carboxylated monomers such as itaconic, fumaric, or acrylic acid and similar monomers during the polymerization. This adds polarity to the polymer chains increasing the interaction with other coating components and polar substrates. Carboxylation enables the preparation of stable, ionically cross-linked, water insoluble resins.

It is also noted that, while the emulsifier of the present invention is the only emulsion polymerization emulsifier required during polymerization, the invention emulsifier can be employed in conjunction with other emulsifiers.

As stated in the Summary of the Invention, lower emulsifying agent levels and greater adhesive strength can be accomplished in latex adhesive systems by using an emulsifier comprising 100% or less by weight of total emulsifier of a mono- and di-2-hydroxyethane sulfonate derivative or 2-aminoethane sulfonate derivatives of $C_{21}$-cycloaliphatic dicarboxylic acid having the general formula:

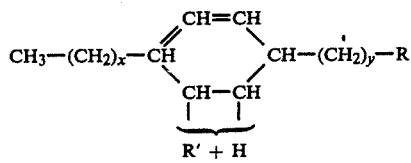

where x and y are integers from 3 to 9, x and y together equal 12, R is

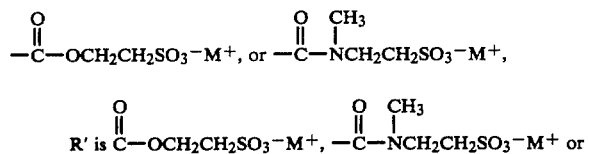

a carboxyl group (COOH), and M+ is an alkali metal, ammonium or amine cation.

The $C_{21}$-cycloaliphatic dicarboxylic acid moiety of the formula described above is derived from conjugated and non-conjugated linoleic acid as fully described in U.S. Pat. No. 3,753,968 to Ward. The $C_{21}$-cycloaliphatic dicarboxylate is prepared by reacting linoleic acid with acrylic acid in the presence of an iodine catalyst involving a Diels-Alder or diene synthesis-type of condensation reaction. While tall oil derived from pine wood pulping is the preferred source of the linoleic acid, other suitable sources are vegetable oils and the like.

Introduction of the hydroxy- or aminoethane sulfonate moiety can be accomplished by condensation of the analogous alcohol or amine to the $C_{21}$-cycloaliphatic dicarboxylic acid under anhydrous conditions or to the analogous acid dichloride via the Schotten-Baumann method.

The mono- and di-2-hydroxyethane derivatives of $C_{21}$-cycloaliphatic dicarboxylic acid are the hemi- and bis-isethionates described in patent application Ser. No. 395,252, filed July 6, 1982, by Richard Du Vernet.

The preferred di-2-hydroxyethane sulfonate derivative of $C_{21}$-cycloaliphatic dicarboxylic acid has the general formula

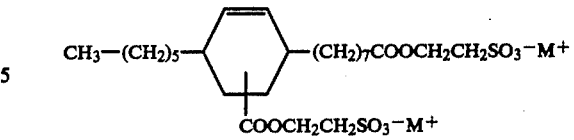

wherein M+ is an alkali metal, ammonium or amine cation.

The preferred 2-aminoethane sulfonate derivative of $C_{21}$-cycloaliphatic dicarboxylic acid has the general formula

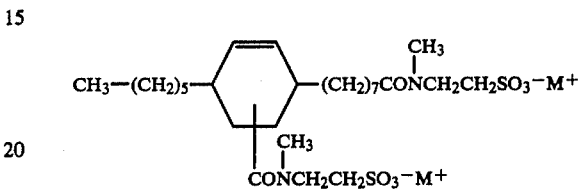

wherein M+ is an alkali metal, ammonium or amine cation.

In the process described for this invention, the emulsifying agent is dissolved in the aqueous phase prior to introduction of the monomer phase. Total amount of the dispersing agents which are the subject of the invention is 0.5 percent to 5 percent based on the total monomer polymerized. Higher levels than 5 percent would be unnecessary and lower levels than 0.5 percent would depend on the stability of the polymer dispersion being prepared. Catalysts or initiators used are generally of the peroxide or hydroperoxide type such as benzoyl peroxide, tertiary butyl hydroperoxide, and peroxysulfates such as ammonium or potassium persulfate or azides. These initiators may be added to the aqueous solution of emulsifying agent prior to introduction of the monomer phase or to the blended water monomer emulsifier system depending upon whether heat or chemicals are utilized to decompose the initiator to a free radical.

The polymer dispersion described in the process of this invention might be prepared by polymerization such that polymer solids are between 10 percent and 60 percent at pH from 2 to 12. Compositions containing from about 20 percent to 50 percent of polymer solids and having a pH of from about 3 to 9 are preferred. Higher concentrations of solids can be achieved by conventional techniques for water removal from polymeric dispersions. Coatings compositions subject to this invention are often formulated with emulsion polymer dispersions in excess of 50 percent solids based on polymer.

A particular utility of this invention involves the production of carboxylated styrene-butadiene copolymers as adhesives for carpet laminating formulations. Tufted carpet generally consists of pile fiber backing locked into a primary backing to which a secondary backing, often jute, is adhered. Backings can also be made of polypropylene. The adhesive serves the purpose of binding the fiber tufts into the construction and binding the backings together while adding dimensional stability, density and decreased flexing to the finished carpet. A typical carpet adhesive latex composition is shown in Table I.

TABLE I
A TYPICAL LATEX COMPOSITION FOR CARPET LAMINATING ADHESIVE

| Material | Active Parts (Weight) |
|---|---|
| Butadiene | 40 |
| Styrene | 59 |
| Itaconic Acid | 1 |
| t-Dodecyl Mercaptan | 0.15 |
| EDTA* | 0.06 |
| Emulsifier | 0.5 to 5 |
| Persulfate | 0.75 |
| Water (to 50% solids) | |
| $Na_2CO_3$ | 0.4 |

*Tetrasodium Ethylene Diamine Tetraacetate

The emulsifier level reported by Klein in "Carpet Laminating Adhesive Latices" in *Advances in Emulsion Polymerization and Latex Technology*, Vol. II, is generally 4.5 parts per 100 parts total monomer. Sulfate or sulfonate anionic emulsifiers are used since the polymerization is often conducted at acidic pH. These strong organic acids remain ionized to provide colloidal stability.

After a latex of suitable conversion and particle size is obtained, compounding into a carpet laminating adhesive formulation is required. A typical formulation can be found in Table II.

TABLE II

| Component | Active Weight | Activity |
|---|---|---|
| Latex Base | 100.00 | 55% |
| Water to 82% Solids | | |
| Filler* | 400.00 | dry (100%) |
| Polyacrylate Thickener | (as required) | 10–16% |
| Froth Aid | 0–1.00 | 30% |

*Whiting D-70

The compounded formulation is applied to the primary backing, followed by lamination of the secondary backing. After drying and curing of the carpet composition, tensile strength of the adhesive bond is determined through delamination of secondary backing.

The invention is further described by the following examples.

EXAMPLE 1

The preferred 2-aminoethane sulfonate derivative of $C_{21}$-cycloaliphatic dicarboxylic acid, $C_{21}$-cycloaliphatic dicarboxylic ditaurate, was prepared by the Schotten-Baumann method via the $C_{21}$-cycloaliphatic dicarboxylic dichloride and aqueous N-methyl taurine. The dichloride was prepared from $C_{21}$-cycloaliphatic dicarboxylic acid (245 grams) using at least a 0.1 molar excess of $PCl_3$ (69 grams), reacted by shaking in a 500 mL separatory funnel for from about five to ten minutes. After standing for approximately 24 hours, the bottom layer of $H_3PO_4$ and unreacted $PCl_3$ (34.2 grams) was driven off. A portion of the resulting top layer (100 grams) of the dichloride was then added to aqueous N-methyl taurine (62 grams at 100% active). Final product solids were 62%. The pH was maintained between 8 and 9 with 38 grams of 50% NaOH and temperature was kept below 60° C. during the reaction between the acid chloride and taurine. Molar ratio of taurine to dichloride was 1.6 to 1.

EXAMPLE 2

The $C_{21}$-cycloaliphatic dicarboxylic ditaurate prepared in Example 1 was employed as emulsifier in the polymerization of a carboxylated styrene-butadiene latex of 40% solids.

Polymerization is conducted in an 18-liter pressure reactor by charging a solution containing: 3,500 grams deionized water, 1,500 grams of 40% solids polystyrene seed latex having 0.1 micrometer (1,000 angstroms) particle diameter that was prepared previously in laboratory glassware using 27 grams (4.5 parts per 100 parts styrene) of the emulsifier prepared in Example 1. Also added in the charge is: 15 grams itaconic acid, 2 grams EDTA (sodium salt of ethylene diamine tetraacetic acid), 10 grams sodium carbonate and 15 grams potassium peroxysulfate. To this charge at 60° C., the following are added simultaneously and continuously over 4 hours with a metering pump: 2,232 grams styrene, 1,920 grams butadiene, a solution containing 2800 grams deionized water, 21 grams of the emulsifier, 48 grams itaconic acid, 9.2 grams sodium carbonate and 25 grams potassium peroxysulfate. The temperature is maintained at 60° C. until conversion of monomer to polymer is over 90%, usually requiring 6 hours to 24 hours total time.

After a conversion of 90% is reached, the resulting latex was adjusted to pH 6.0 with sodium carbonate, then to pH 9.0 with ammonium hydroxide. Concentration of the adjusted latex to 50% solids by air drying at 60° C. in thin films on a rotating disc is then necessary for compounding at 82% solids. After a satisfactory conversion and particle size was produced, the latex was compounded into the formulation in Table II by conventional mixing techniques.

The carpet construction was laminated and tensile strength of the adhesive bond between the primary backing, carpet tufts, and the secondary backing was determined. Table III gives the comparative compounding data and adhesive bond strengths of the latex polymerized with the $C_{21}$-cycloaliphatic dicarboxylic ditaurate emulsifier versus the same latex polymerized with a commercial emulsion polymerization emulsifier (DOWFAX 2A1) and similarly compounded and formulated.

TABLE III

| Latex Product | Thickener Requirement (Alcogum 6940) (g) | Final Compound Viscosity (cps) | % Solids of Compounded Latex | Density (Weight of Compound Required to Fill 3 oz. cup (g)) | Tensile Strength (Tensometer Units/ 3 in. Strip) |
|---|---|---|---|---|---|
| DOWFAX 2A1 (1.0% emulsifer) | 4.8 | 18,200 | 82.0 | 139.0 | 111 |
| $C_{21}$-Cycloaliphatic Dicarboxylic | 3.5 | 18,200 | 82.0 | 146.6 | 128 |

TABLE III-continued

| Latex Product | Thickener Requirement (Alcogum 6940) (g) | Final Compound Viscosity (cps) | % Solids of Compounded Latex | Density (Weight of Compound Required to Fill 3 oz. cup (g)) | Tensile Strength (Tensometer Units/ 3 in. Strip) |
|---|---|---|---|---|---|
| Ditaurate (1%) | | | | | |

The long chain thickener (polyacrylate) interacts between the adhesive latex particles and the much larger filler particles. If considerable interaction occurs, thickener requirement will be low. Low emulsifier generally increases this ability for interaction, leaving more uncoated surface area on the individual particles to adsorb thickener polymer segments, thereby lowering the thickener requirement. Also, thickener requirements are lowered by increasing the adhesive formulation solid concentration. It can be seen from Table III that the thickener requirement was lower for the ditaurate emulsified polymer. Also, the adhesion produced by this latex was superior to that produced by the DOWFAX 2A1 emulsified polymer.

EXAMPLE 3

Polymerization, compounding, and carpet lamination tests were also performed using the preferred di-2-hydroxyethane sulfonate derivative of $C_{21}$-cycloaliphatic dicarboxylic acid at compounded latex solids of 77% and 82%. Comparisons were made with similarly polymerized, compounded and formulated latexes using, as polymerization emulsifier, benzyldodecylbenzene sulfonate, sodium laurel sulfonate and DOWFAX 2A1. In all cases, the emulsifiers were employed in an amount of 2%, based on the latex. The results are reported in Table IV.

TABLE IV

| Latex Product | Thickener Requirement (Alcogum 6940) (g) | Final Compound Viscosity (cps) | % Solids of Compounded Latex | Density (Weight of Compound Required to Fill 3 oz. cup (g)) | Tensile Strength (Tensometer Units/ 3 in. Strip) |
|---|---|---|---|---|---|
| $C_{21}$-Cycloaliphatic Dicarboxylic Di-2-hydroxyethane Sulfonate | 4.8 | 19,550 | 82.0 | 140.1 | 132 |
| | 11.0 | 17,500 | 77.2 | 152.5 | 122 |
| BDDBSA[1] | 11.5 | 17,200 | 78.2 | 113.0 | 117 |
| SLS[2] | 9.0 | 17,050 | 76.6 | 85.0 | 49 |
| DOWFAX 2A1 | 7.9 | 18,050 | 78.0 | 125.0 | 49 |

[1] Benzyldodecylbenzene Sulfonate
[2] Sodium Lauryl Sulfate

It can be seen in Table IV that when the invention $C_{21}$-cycloaliphatic dicarboxylic di-2-hydroxyethane sulfonate emulsifier was compounded at 77% and 82%, the thickener requirements were 11.0 grams and 4.8 grams, respectively. The resulting tensile strength increased from 122 units to 132 indicating that a latex prepared from an emulsifier with good properties such as the invention emulsifier will produce a higher solid adhesive with lower thickener requirement and better adhesion. However, the data also indicate that low thickener requirement alone does not always give improved adhesion. It can be seen that some emulsifiers produce formulations with equivalently low thickener requirement but a variety of adhesion values. Sodium lauryl sulfate latex required less thickener than some other latex compounds, but gave inferior adhesion. The invention emulsifier had relatively low thickener requirements and high adhesion.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A compound of the formula

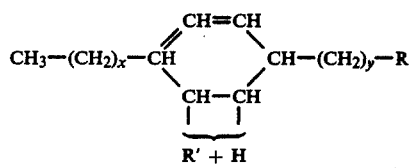

where x and y are integers from 3 to 9, x and y together equal 12, R is

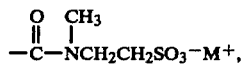

and $M^+$ is an alkali metal, ammonium or amine cation.

2. The compound of claim 1 wherein R and R' are $$-\overset{O}{\underset{\|}{C}}-\overset{CH_3}{\underset{|}{N}}CH_2CH_2SO_3^-M^+$$

and $M^+$ is the alkali metal cation $Na^+$.

3. A process for preparing emulsion polymerization emulsifying 2-aminoethane sulfonate derivatives of $C_{21}$-cycloaliphatic dicarboxylic acid comprising the steps of
(a) reacting $C_{21}$-cycloaliphatic dicarboxylic acid with a 0.1 molar excess of phosphorus trichloride at room temperature and atmospheric pressure for from 5 to 10 minutes, permitting separation between a top layer of $C_{21}$-cycloaliphatic dichloride and a bottom layer of phosphoric acid and unreacted phosphorus trichloride,
(b) reacting N-methyl taurine with the $C_{21}$-cycloaliphatic dichloride product of step (a) at a molar ratio of 1.6 to 1 and maintaining the reaction pH between 8 and 9 and the reaction temperature below 60° C.

* * * * *

UNITED STATES PATENT AND TRADEMARK OFFICE
CERTIFICATE OF CORRECTION

PATENT NO. : 4,455,263
DATED : June 19, 1984
INVENTOR(S) : John W. Noble

It is certified that error appears in the above—identified patent and that said Letters Patent is hereby corrected as shown below:

In the Abstract on page 1, column 2, line 6,

" 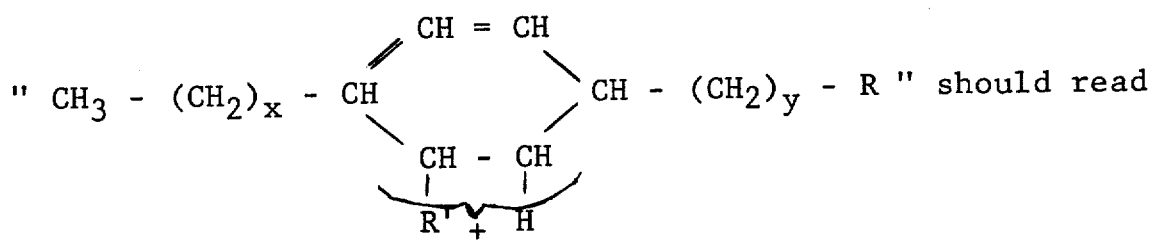 " should read

-- 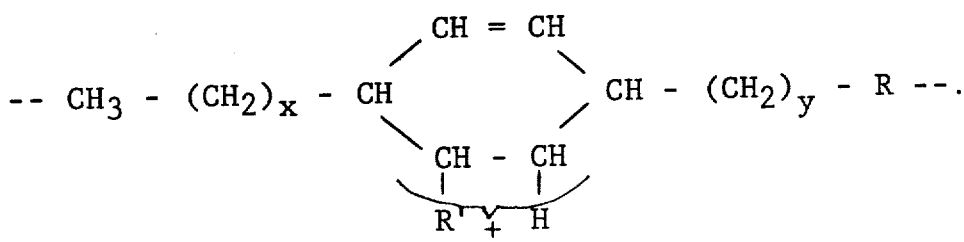 --.

In the Summary of the Invention, column 2, line 13,

" 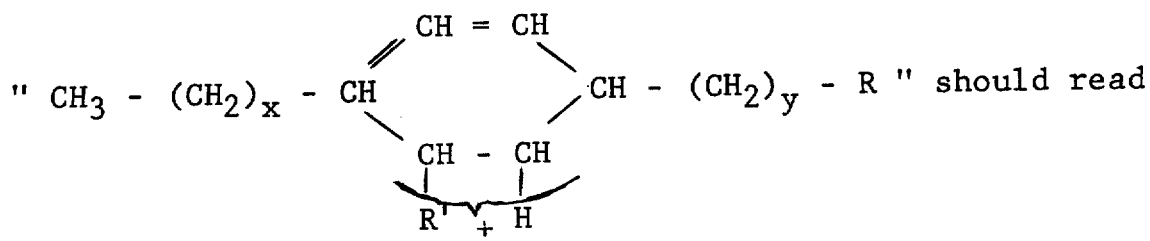 " should read

UNITED STATES PATENT AND TRADEMARK OFFICE
CERTIFICATE OF CORRECTION

PATENT NO. : 4,455,263            Page 2 of 3
DATED : June 19, 1984
INVENTOR(S) : John W. Noble It is certified that error appears in the above—identified patent and that said Letters Patent is hereby corrected as shown below:

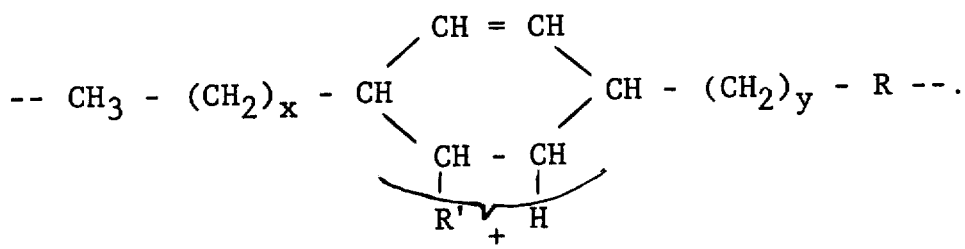

In the Description of the Preferred Embodiments, column 3, line 22, $$\text{"}CH_3 - (CH_2)_x - CH \overset{\displaystyle CH = CH}{\underset{\displaystyle \underset{R' \;\; H}{CH - CH}}{}} CH - (CH_2)_y - R \text{ "}$$

should read $$-- CH_3 - (CH_2)_x - CH \overset{\displaystyle CH = CH}{\underset{\displaystyle \underset{R' \;\; H}{CH - CH}}{}} CH - (CH_2)_y - R --.$$

UNITED STATES PATENT AND TRADEMARK OFFICE
CERTIFICATE OF CORRECTION

Page 3 of 3

PATENT NO. : 4,455,263
DATED : June 19, 1984
INVENTOR(S) : John W. Noble

It is certified that error appears in the above—identified patent and that said Letters Patent is hereby corrected as shown below:

In column 5, line 42, "of secondary backing." should read --of the secondary backing.--.

In column 8, claim 1, line 25, $$\text{"} CH_3 - (CH_2)_x - CH \overset{\overset{CH = CH}{\diagup \diagdown}}{\underset{\underset{R'\quad H}{|\quad |}}{\diagdown CH - CH \diagup}} CH - (CH_2)_y - R \text{ " should read}$$

$$-- CH_3 - (CH_2)_x - CH \overset{\overset{CH = CH}{\diagup \diagdown}}{\underset{\underset{R'\quad H}{|\quad |}}{\diagdown CH - CH \diagup}} CH - (CH_2)_y - R --.$$

Signed and Sealed this

Twenty-third Day of October 1984

[SEAL]

Attest:

GERALD J. MOSSINGHOFF

Attesting Officer    Commissioner of Patents and Trademarks